July 12, 1960  C. B. STANTON  2,944,501
APPARATUS FOR MAKING BRANCHED PIPE FITTINGS
Filed June 17, 1954  13 Sheets-Sheet 1

INVENTOR:
Charles Bernard Stanton,
BY Cushman, Darby & Cushman
ATTORNEYS

INVENTOR:
Charles Bernard Stanton,
BY Cushman, Darby & Cushman
ATTORNEYS.

INVENTOR:
Charles Bernard Stanton,
BY Cushman, Darby & Cushman
ATTORNEYS.

INVENTOR:
Charles Bernard Stanton,
BY Cushman, Darby & Cushman
ATTORNEYS

July 12, 1960 C. B. STANTON 2,944,501
APPARATUS FOR MAKING BRANCHED PIPE FITTINGS
Filed June 17, 1954 13 Sheets-Sheet 13

INVENTOR
CHARLES BERNARD STANTON

BY Cushman, Darby & Cushman
ATTORNEYS

United States Patent Office 2,944,501
Patented July 12, 1960

2,944,501

APPARATUS FOR MAKING BRANCHED PIPE FITTINGS

Charles Bernard Stanton, Birmingham, England, assignor to Imperial Chemical Industries Limited, a corporation of Great Britain Filed June 17, 1954, Ser. No. 437,387

Claims priority, application Great Britain Sept. 18, 1950

7 Claims. (Cl. 113—44)

This invention relates to apparatus for making branched pipe fittings and this application is a continuation-in-part of my copending application filed on September 18, 1951, under Serial Number 247,147, now abandoned, and with the title "Improvements in or Relating to Methods and Apparatus for Making Branched Pipe Fittings."

In the specification accompanying my aforesaid copending application there is described a method, combining the features of hydraulics with mechanical timing and control, of forming a branched pipe fitting from a substantially-tubular blank, which comprises the steps of positioning said blank in a die cavity having at least one branch cavity communicating therewith, applying endwise pressure to said blank, simultaneously with the application of endwise pressure to the blank continuously applying high hydraulic pressure to the interior of said blank under controlled conditions, whereby said blank is caused to flow into said branch cavity to form a branch, and continuously supporting and controlling the section of the end portion of said branch throughout the forming operation.

Also, in that specification there is described an apparatus, combining the features of hydraulics with mechanical timing and control, for forming branched pipe fittings from substantially tubular blanks comprising a plurality of complementary die members defining a main cavity adapted to receive said blank and at least one branch cavity communicating with said main cavity, a plunger operative in said main cavity to apply endwise pressure to said blank, means for applying high hydraulic pressure to the interior of said blank through said plunger, and means in said branch cavity for continuously supporting the end portion of the branch formed therein.

The present invention is directed to the same important objectives as that of my aforesaid co-pending application, the primary object of this invention being to provide an improved apparatus, combining the features of high pressure hydraulics with mechanical timing and control, for forming branched pipe fittings and tubular fittings from substantially tubular blanks.

Other objects and advantages of the present invention will become clear from the following description of a preferred embodiment of the invention. The preferred embodiment is illustrated in the accompanying drawings of which:

Figures 1 and 1a together show a side elevational view of the preferred apparatus;

Figures 2 and 2a together show a rear elevational view of the preferred apparatus;

Figures 3 and 3a together show a sectional view taken along the line III—III of Figure 1;

Figures 4 and 4a together show a part sectional view taken along the line IV—IV of Figure 2;

Figure 1:
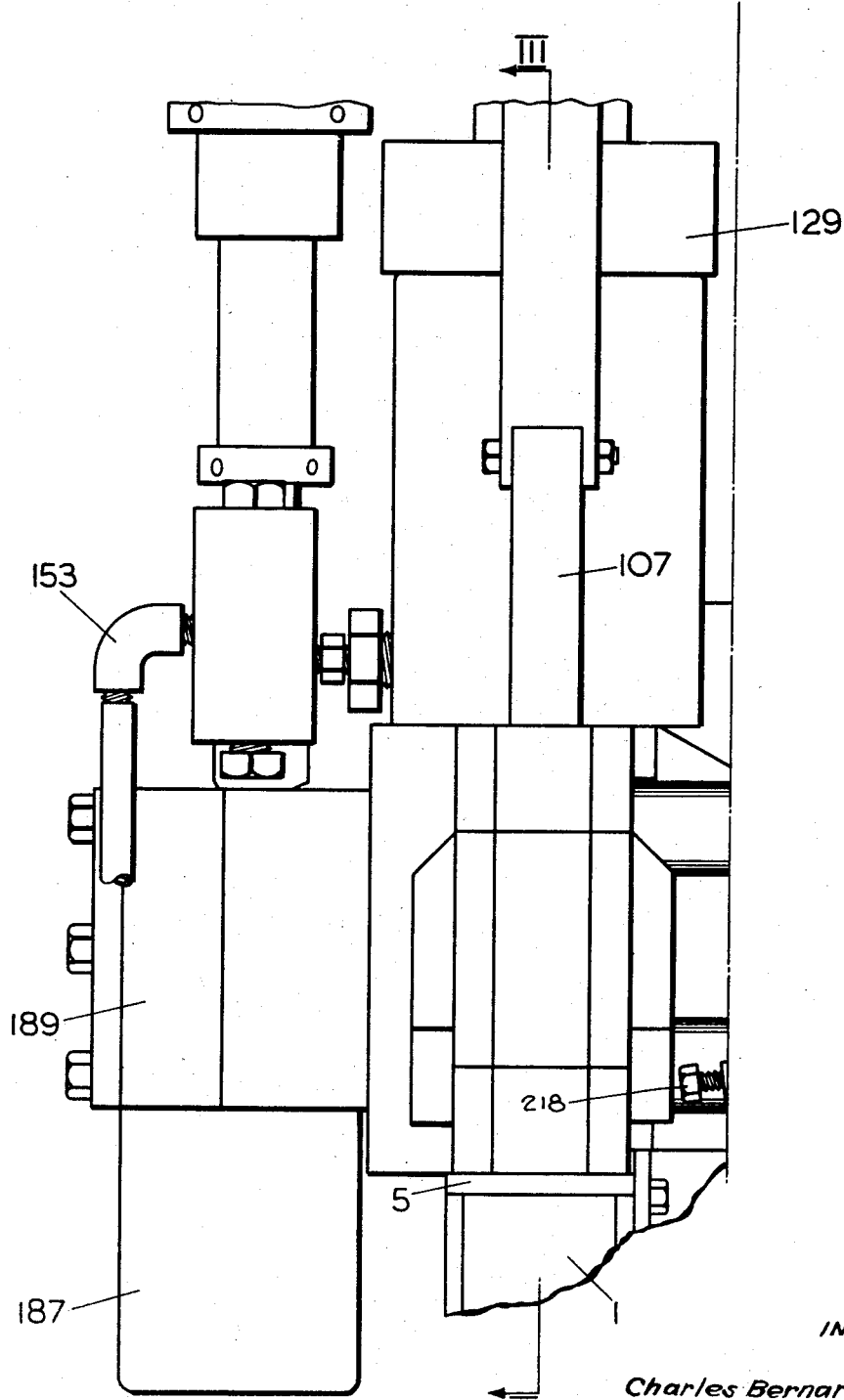

Referring to the drawings, the preferred apparatus (which is generally similar, in external appearance, to a hydraulically-operated press) comprises a base portion 1 and a hydraulically-operated head member 3 adapted for upward movement away from or downward movement towards the base portion. The base portion carries a supporting plate 5 which is secured to the base portion by screws 7. A die-housing 9 is fixedly mounted with respect to the supporting plate 5 and four tie bars 11 extending from the front to the rear of the machine pass through holes in the die housing. The die housing has a substantially-centrally-located die aperture for receiving a die. The die is in two parts, a rearward portion 13 being held in a fixed position by, inter alia, a thrust plate 15, which is fastened by screws 17 threaded into blind holes in the die housing 9, and a forward portion 19, which is arranged to be movable towards or away from the fixed rearward portion 13, by a die-opening and die-closing mechanism to be described hereinafter.

Figure 4:
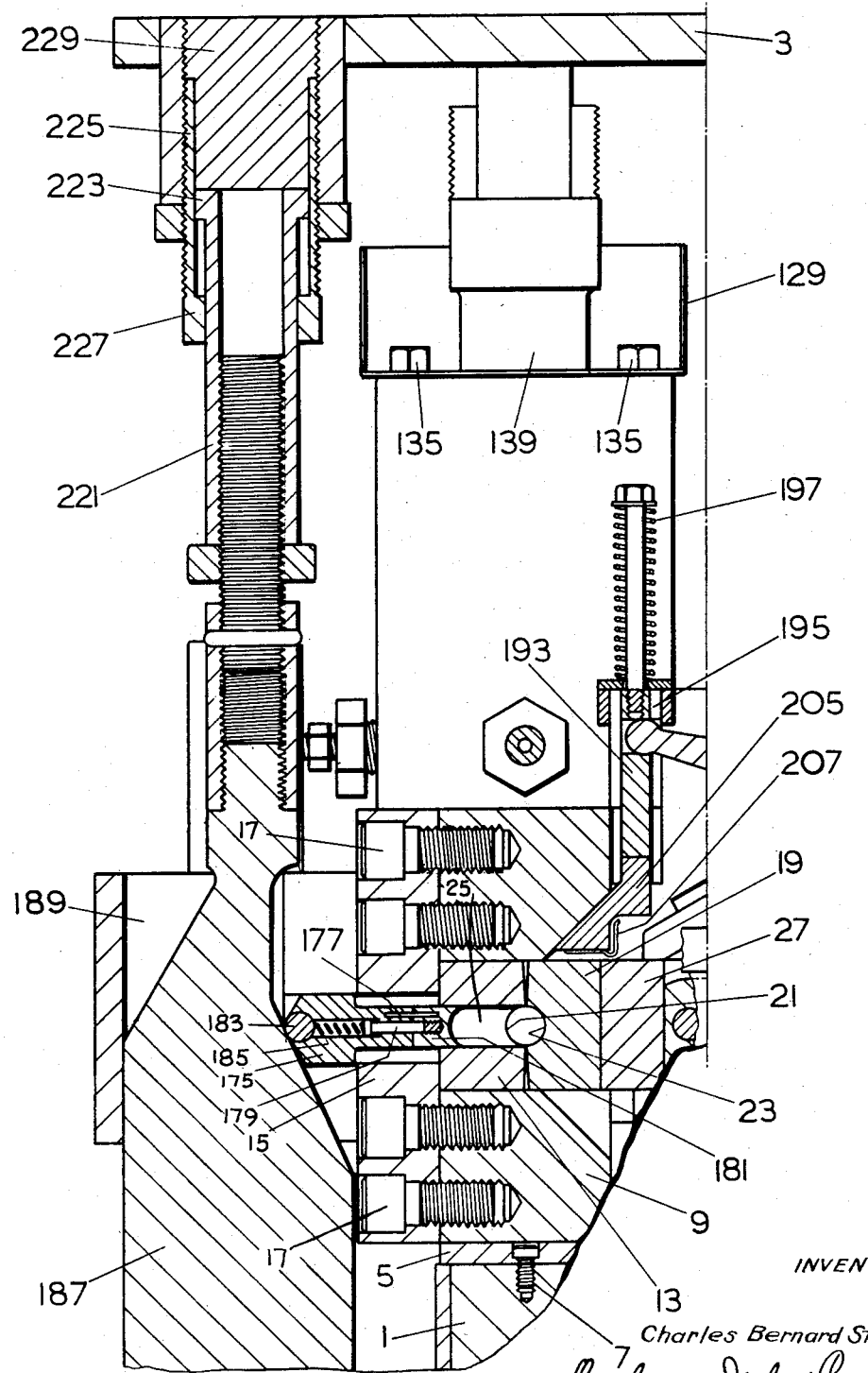

The rearward portion 13 and the forward portion 19 of the die having mating semi-cylindrical channels 21, 23 formed in those surfaces which abut when the die is in a closed position, and the channels 21, 23 together provide a tubular channel which runs from side to side of the die and which is suitable for receiving a substantially tubular blank which is to be made into a branched pipe fitting. The fixed rearward portion 13 of the die has a further tubular channel 25 which runs substantially at right angles to the aforesaid tubular channel 21, 23, and which opens into the central portion of the aforesaid tubular channel 21, 23 thereby to provide a branch cavity. This branch cavity opens to the rear of the machine, as shown in Figure 4.

The movable forward portion 19 of the die forms part of a die-opening and die-closing mechanism (see particularly Figures 5 and 6) and is rigidly connected to a supporting block 27 mounted for backward or forward movement in tracks 29 supported by the general framework of the machine. The supporting block 27 is bifurcated at its end remote from the portion 19 and supports a part roller 31 which is mounted upon a shaft 33 carried by the bifurcated part of the block 27. One end of a link 35, which forms part of a toggle mechanism is also mounted upon the shaft 33. The other end of the link 35 is mounted upon a shaft 37 and there is also mounted upon the shaft 37 an end of a link 39 which forms another part of the toggle mechanism. The other end of the link 39 is mounted upon a shaft 41 carried by a part roller 43 at the bifurcated end portion of a block 45 forming part of the general framework of the machine.

The shaft 37 carries a cam roller 47 which is arranged to co-operate with an arcuate-like cam track 49 formed in a rectangular cam plate 51. The cam plate 51 is pivotally mounted upon a shaft 53 supported by the general framework of the machine. One end of a link 55 which forms part of a second toggle mechanism is mounted on a shaft 57 carried by the plate 51 and the other end of the link 55 is mounted upon a free shaft 59. The free shaft 59 has also mounted upon it an end of a link 61 which forms another part of the second toggle mechanism, and the other end of the link 61 is mounted on a shaft 63 freely passing through part 65 of the general framework of the machine. The other end portion of the shaft 63 has an operating handle 67 keyed thereto. The free shaft 59 carries a depending arm 69 at the lower end of which is mounted a roller 71, hereinafter to be described.

In order to provide a fine adjustment for the forward portion 19 of the die when in closed position, the front face of the block 45 is angularly inclined and engages against the inclined surface of an adjusting block 73. The adjusting block is mounted for sliding movement in an upward or downward direction in the part 65 of the general framework of the machine and is arranged to be moved by an adjusting screw 75 fitted through an arm 77 carried by the part 65.

The aforesaid tie bars 11 pass through the part 65 of the general framework of the machine and are secured thereto by screwed collars 79.

Figure 3:
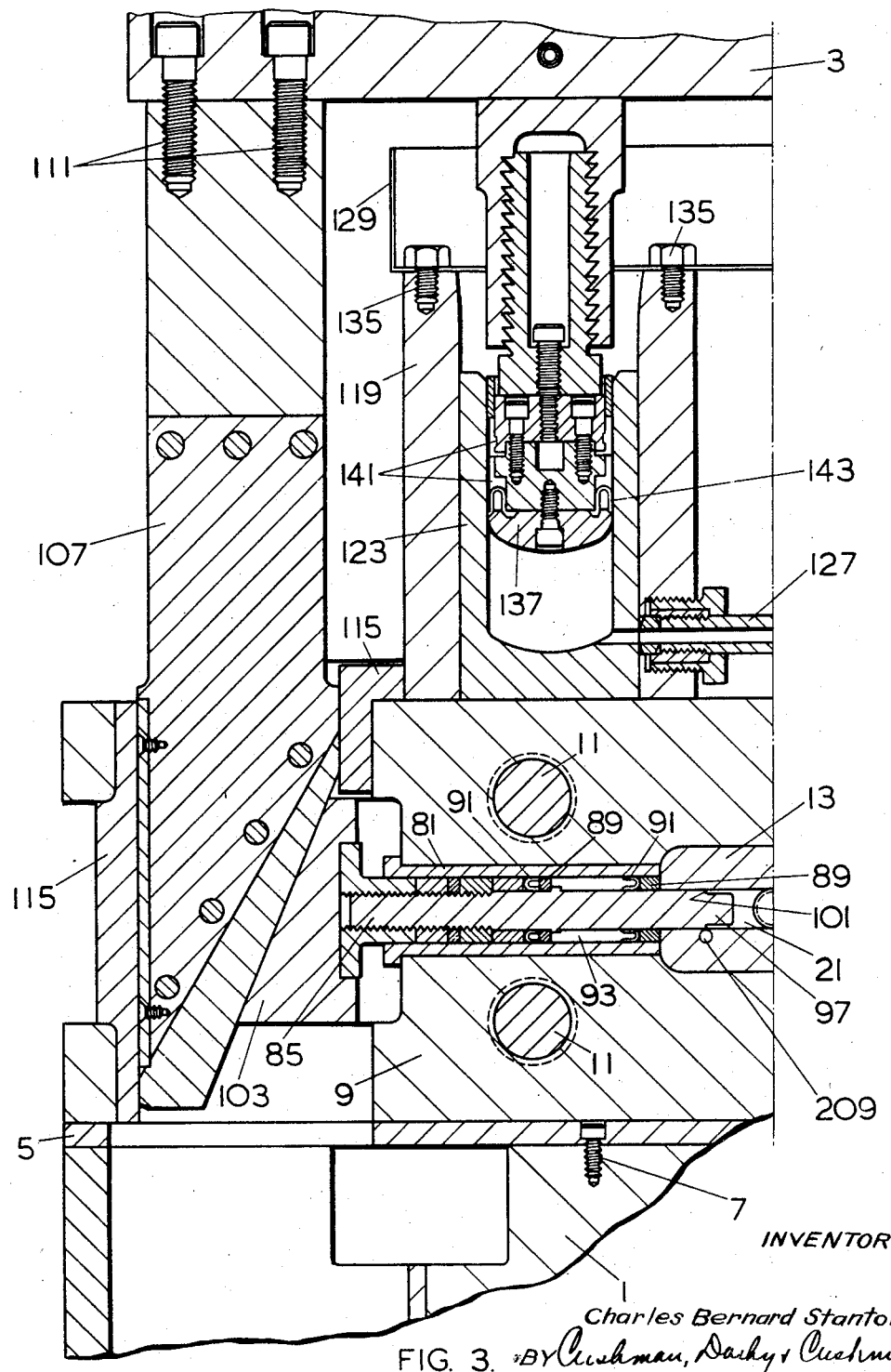
Figure 3A:
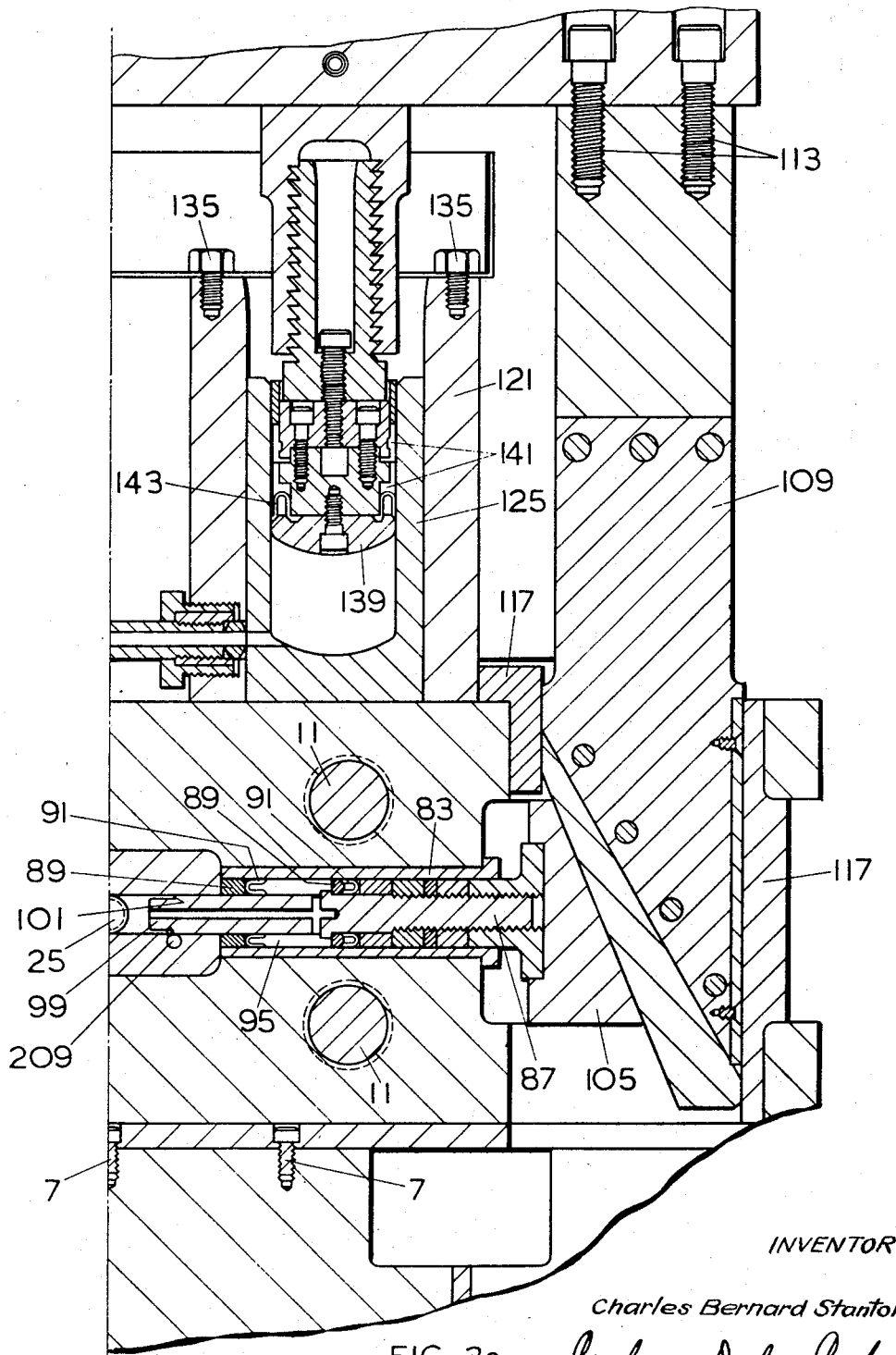

A tubular channel, see Figure 3, substantially coaxial with the tubular channel 21, 23 in the die but of larger diameter, extends from side to side of the die housing 9 and tubular inserts 81, 83, which act as cylinder walls are put in the end portions of the die housing channel.

Plungers 85 and 87 are disposed in the inserts 81 and 83 and suitable glands 89 and sealing rings 91 are disposed between the pistons and the inserts so as to leave spaces 93, 95 between the pistons and the inserts. The leading portions 97, 99 of the pistons are of reduced diameter and provide shouldered portions 101, 103, the shoulders having a depth only slightly less than the thickness of a substantially tubular blank which is to be made into a branched pipe fitting.

The outward ends of the plungers 85, 87 are secured to blocks 103, 105 which have angularly-inclined surfaces, and these inclined surfaces co-operate with inclined surfaces associated with the lower end portions of depending arms 107, 109 which are secured at their upper ends to the head member 3 by screws 111, 113. The depending arms 107, 109 are guided for upward or downward movement with the head member 3 by guideways 115, 117, associated with the general framework of the machine.

Two hydraulic pressure vessels 119, 121 are disposed upon the die housing 9 and are provided with cylinders 123, 125 connected together by a pipe 127. The pipe 127 passes through the vessels 119, 121 in a fluid-tight manner. As shown in Figure 3, the cylinders 123, 125 do not extend to the upper ends of the vessels 119, 121 which support a liquid storage tank 129 which is connected by a priming pipe 131 to a liquid supply, and which has an overflow pipe 133. A constant head of air-free liquid may thus be maintained in the cylinders. The tank 129 is secured to the vessels 119, 121 by screws 135 and is in communication with the vessels 119, 121.

Pistons 137, 139 are associated with the vessels 119, 121 and cylinders 123, 125, and the pistons are secured to the head member 3 so as to be movable therewith. Each piston is provided with glands 141 and sealing rings 143. When the pistons are in their uppermost position, liquid is able to flow from the storage tank 129 to the cylinders 123, 125.

Figure 7:
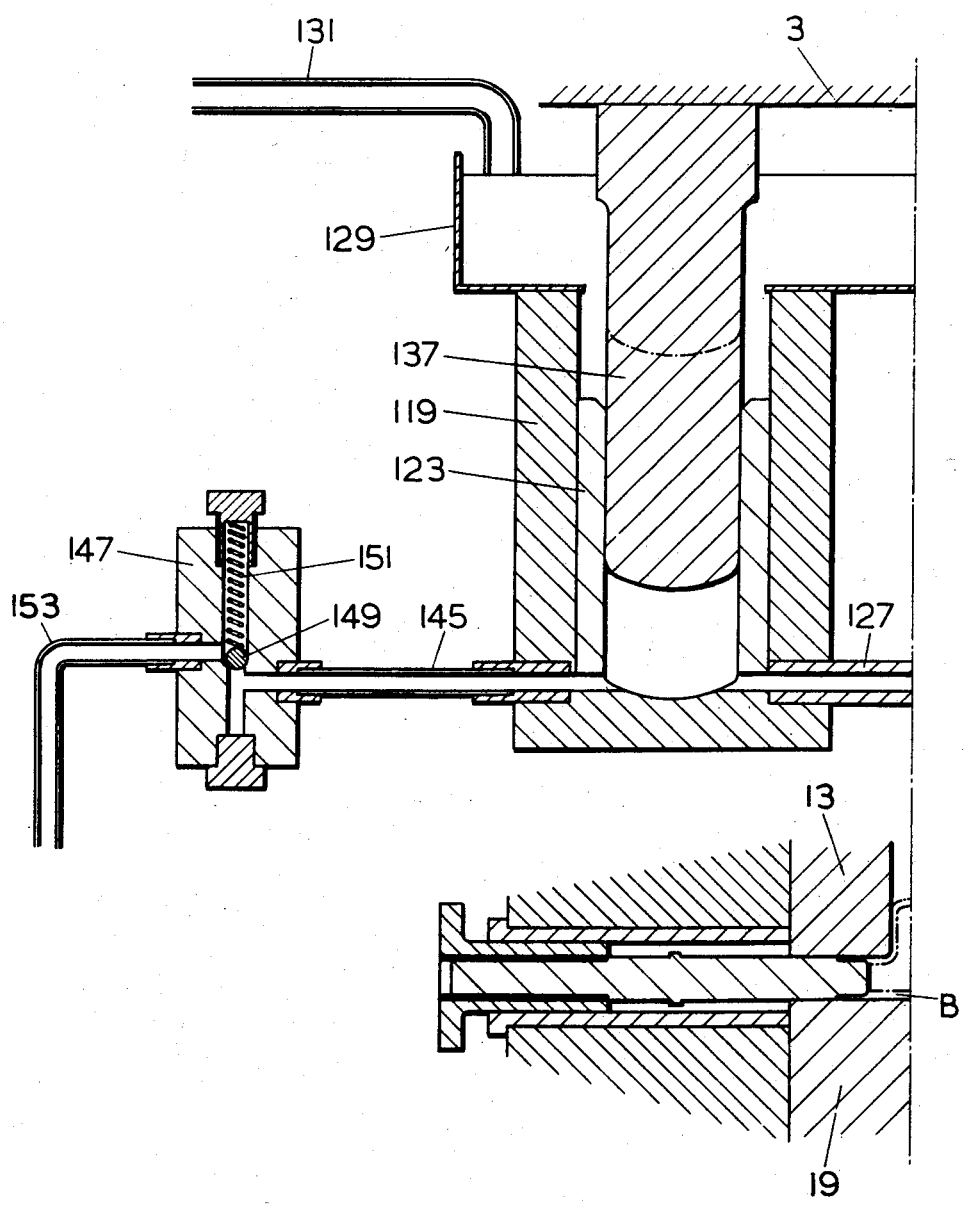
Figure 7 is a schematic view of the hydraulic system of the preferred apparatus.
Figure 7A:
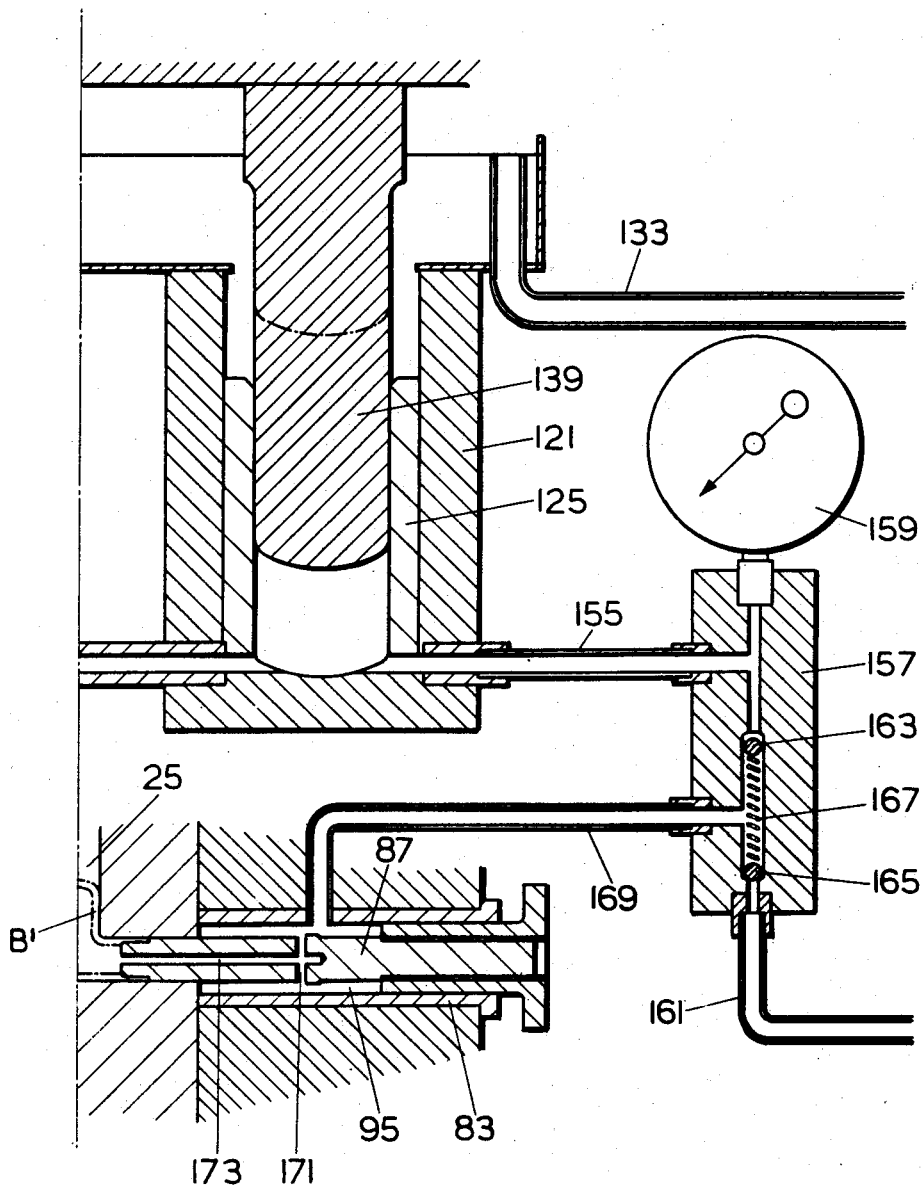
Figure 8:
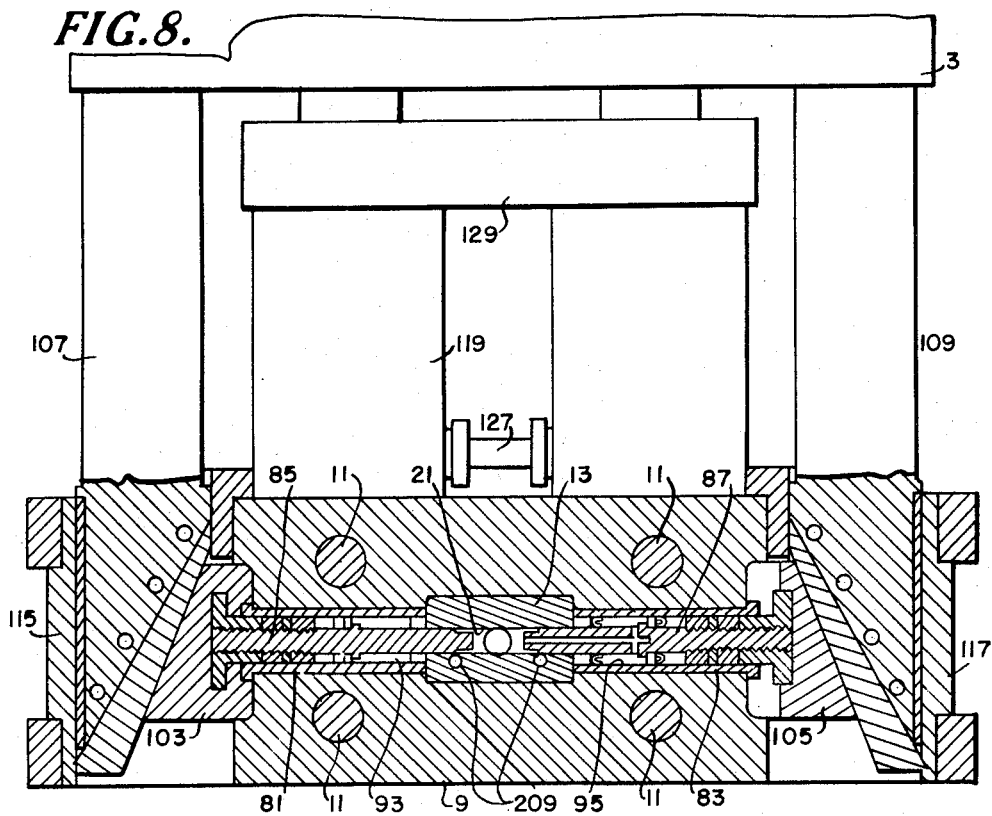
Figure 8 is a front elevational view, partly in vertical section, illustrating the preferred apparatus.

The cylinder 123, as particularly shown in Figure 7, is connected by a pipe 145 to a pressure-relief valve 147, the valve normally being closed by a ball 149 urged by a spring 151 on to a seating within the valve body. The outflow from the valve is carried away by a pipe 153. The other cylinder 125 is connected by a pipe 155 to one side of a check valve 157 and a pressure-indicating device 159 is associated with this check valve. The other side of the check valve is connected by a pipe 161 to a supply of liquid at low pressure. Each side of the check valve is normally in closed position by means of the balls 163, 165 which are urged by a spring 167 against seatings within the valve body. The outlet pipe 169 is connected to the space 95 between the plunger 87 and the tubular insert 83. The plunger 87 is provided with a diametral bore 171 and a longitudinal bore 173, the diametral bore connecting the space 95 with the longitudinal bore 173 which opens into the channel 21, 23 of the die.

A branch supporting plunger is slidably disposed within the branch cavity 25 in the fixed rearward portion of the die and comprises a body portion 175 connected by a peg 177 and a screw 179 to a head portion 181. The head portion, which is capable of movement with respect to the body portion due to the provision of the peg 177 and screw 179, presents, as shown in Figure 4, a semi-cylindrical recess substantially to receive one half of a substantially tubular blank which is to be formed into a branched pipe fitting. The end part of the body portion 175 remote from the head portion 181 is provided with a roller 183 which is adapted, in operation, to co-operate with an inclined surface of a downwardly-extending arm 187 which is indirectly connected, as hereinafter described, at its upper end to the head member 3. The downwardly-extending arm 187 is guided for upward or downward movement by guideways 189. In its normal inoperative position (not shown in the drawings) when the die is open, the head portion 181 is urged by a spring 185 to project slightly forwardly of the fixed rearward portion 13 of the die and may thus act as an ejecting means.

Figure 9:
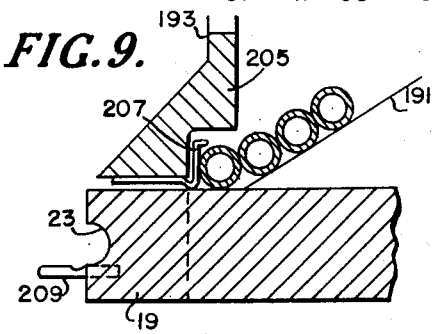
Figures 9, 10 and 11 are similar enlarged fragmentary detailed views illustrating the stages in operation for feeding the tubular blanks to the machine.
Figure 10:
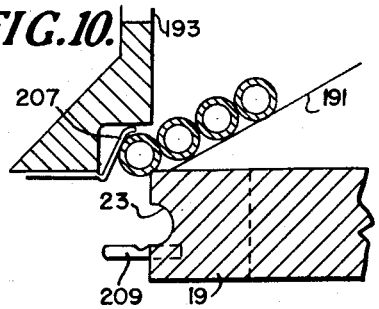
Figure 11:
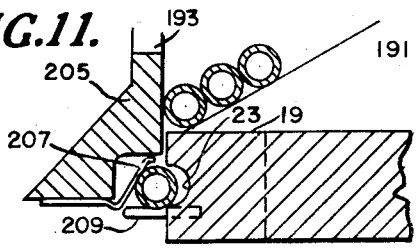

In order semi-automatically to feed substantially tubular blanks, one at a time to the die, an inclined chute 191 is provided, the lower end of the chute terminating just in front of the forward portion 19 of the die when in its open position. This end of the chute 191 is associated with a plunger 193 guided for upward and downward movement by guideways 195 against the action of a spring 197. The plunger 193 co-operates with an arm 199 of a lever, pivotally-mounted on a plate 201, the other arm 203 of the lever acting as an operating handle. The lower end portion 205 of the plunger is provided with a re-entrant spring 207 which is normally urged in a direction toward the chute 191. When the chute is loaded with substantially tubular blanks and the die portion 19 is extended, the upper surface of the latter and the spring 207 serve to prevent downward movement of the blanks, as shown in Figure 9. When the die portion 19 is retracted, spring 207 serves to retain the lowermost blank in a position adjacent the upper corner of the die portion 19, as shown in Figure 10. Downward movement of the plunger will carry the lowermost blank downwardly to a point in front of the forward portion 19 of the die where it will be received in correct spatial relationship by tracks 209 and urged toward recess 23 by the spring 207, as shown in Figure 11. When the plunger 193 is fully retracted another substantially tubular blank will be received by the lower end portion 205 and will be prevented from falling on top of the previous substantially tubular blank by the re-entrant spring 207.

Figure 1A:
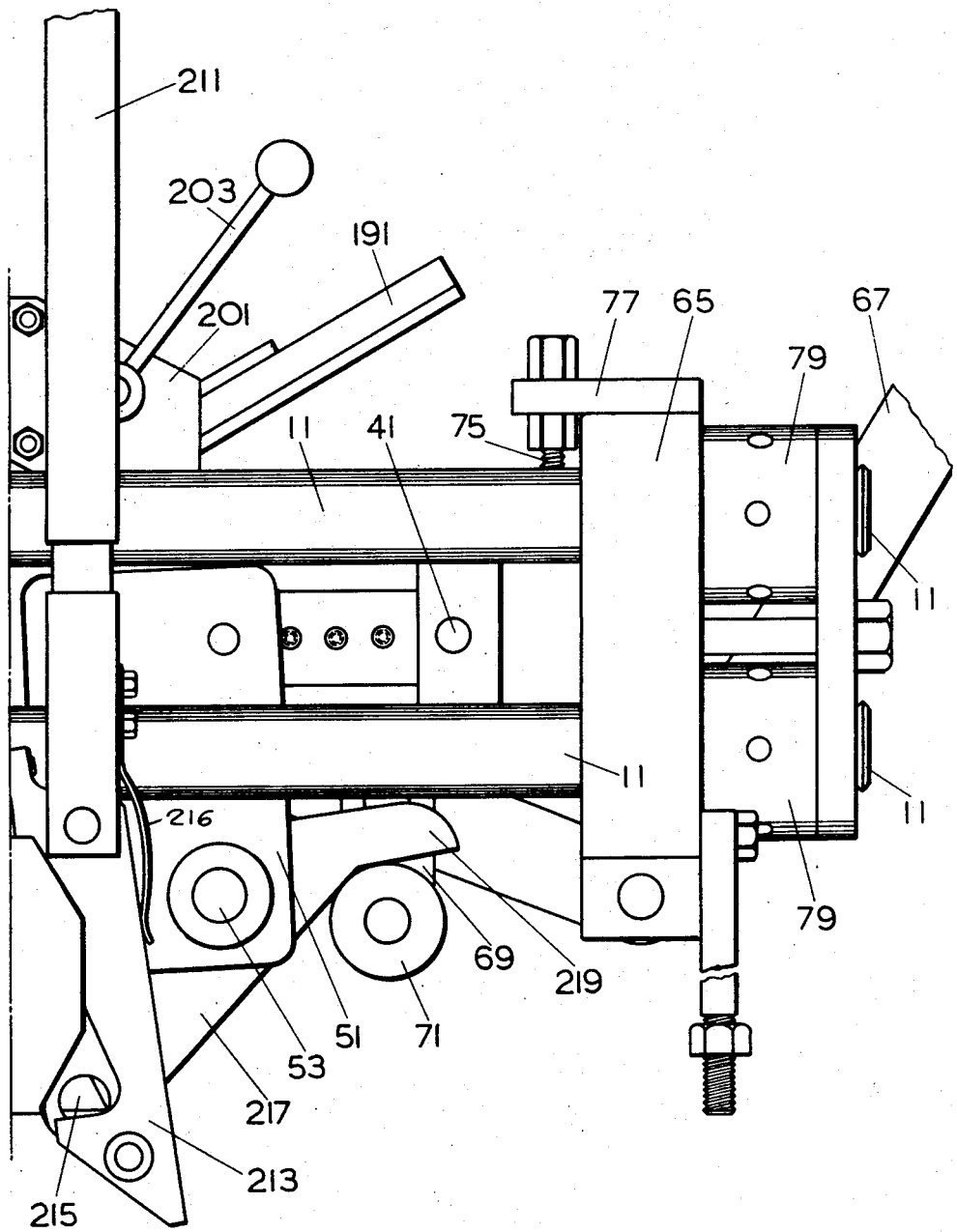
Figure 2:
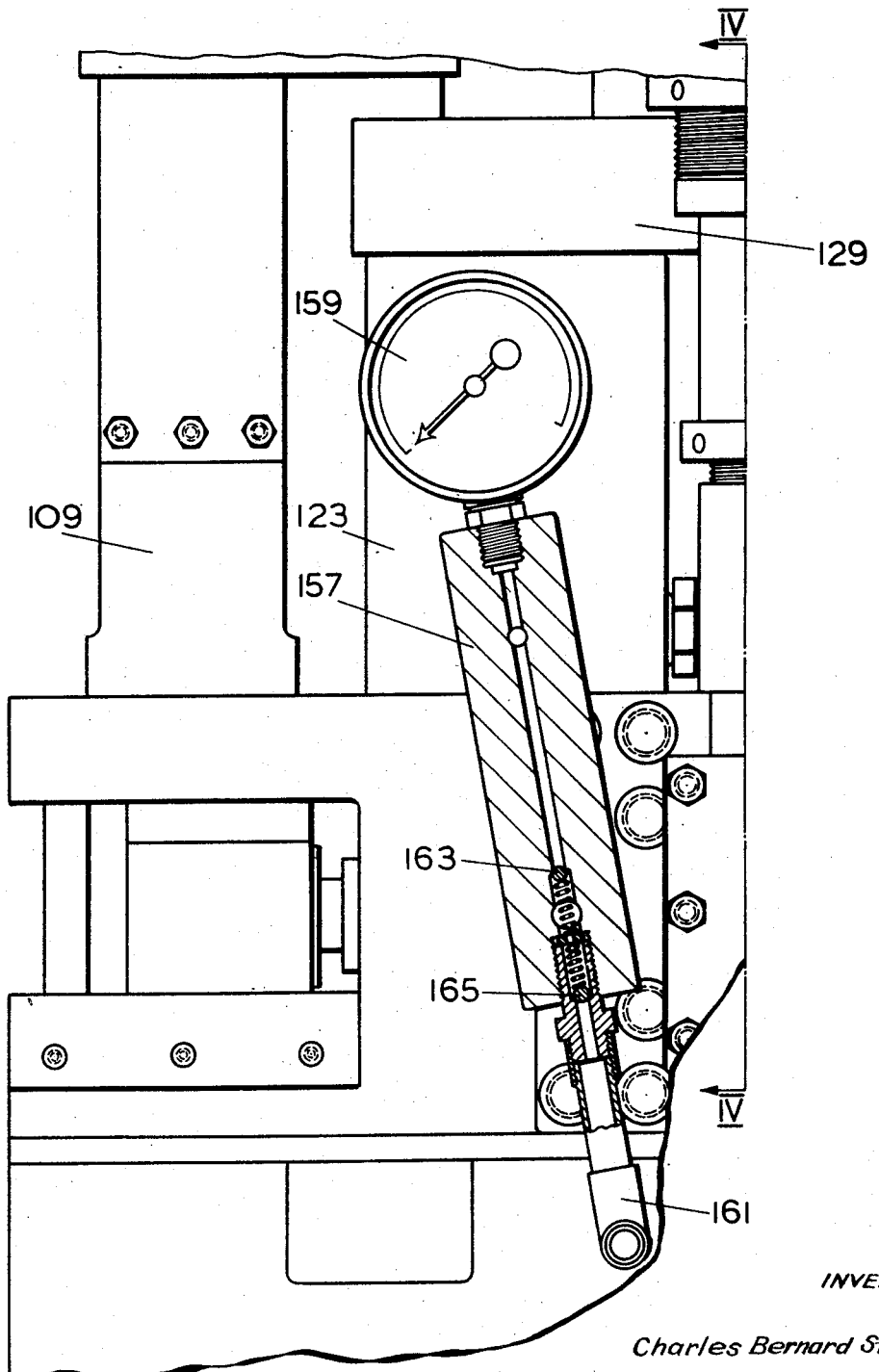
Figure 2A:
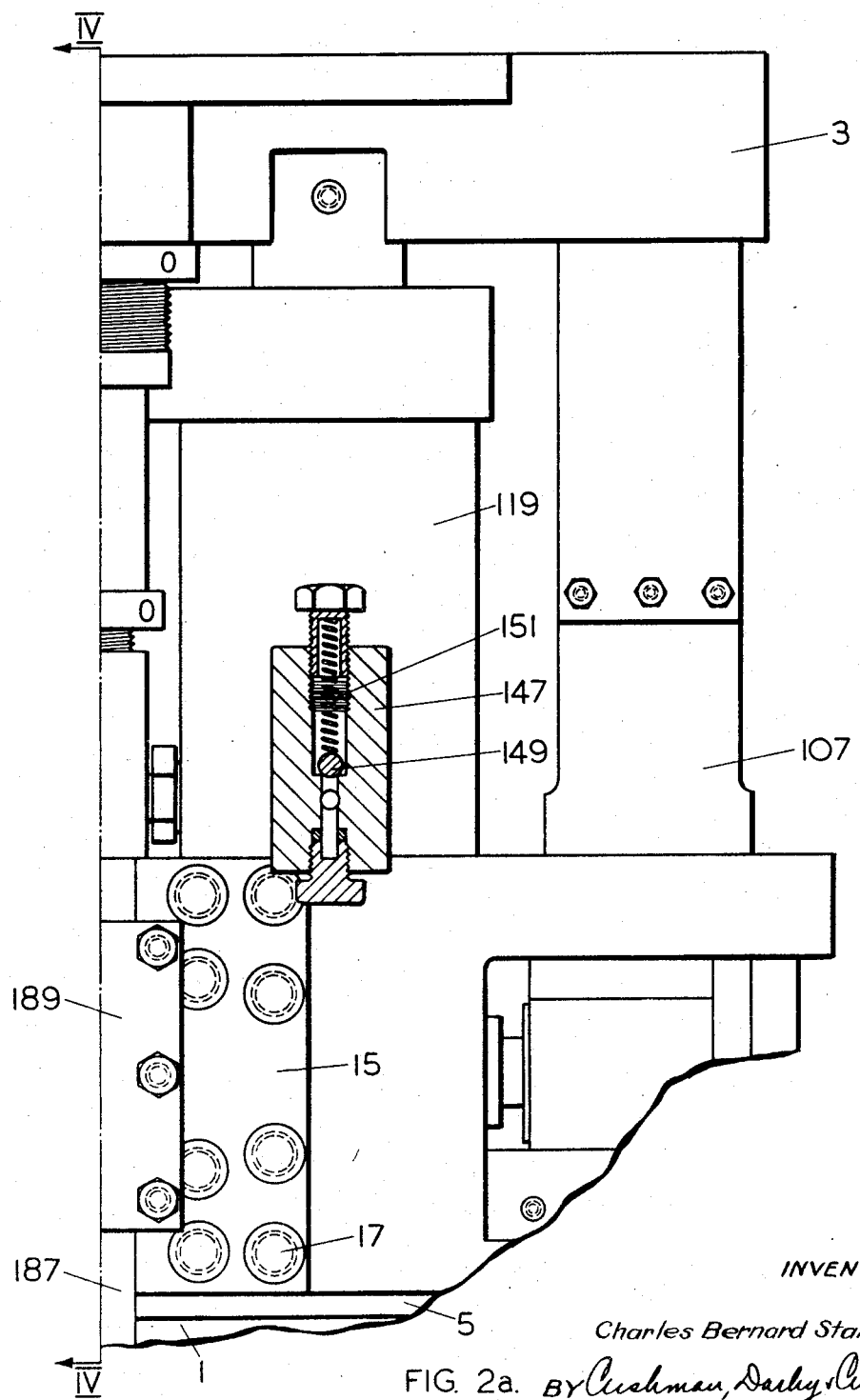

In order positively to open the die mechanism after the formation of a branched pipe fitting from a substantially tubular blank, the head member 3 is provided with a downwardly-depending arm 211 having a hook member 213 pivoted, as at 214, to its lower end portion, as shown in Figures 1 and 1a. The hook member is normally spring urged, as by a leaf spring 216, into a limiting position, as determined by a stop bolt 218, and is adapted to be pivoted away from the stop bolt against the action of the leaf spring into engagement below a projection 215 formed on one arm 217 of a bell-crank lever mounted upon the shaft 53, during its downward movement with the head. During its upper movement, the hook member serves to carry with it the projection 215. The other arm 219 of the bell-crank lever co-operates with the roller 71 on the depending arm 69 so that as the hook member 213 moves upwardly, the roller 71 is moved downwardly. Since the projection 215 moves upwardly in an arcuate path about the axis of rotation of the shaft 53, at a predetermined position during the upward movement of the hook member 213, the projection will move laterally out of engagement therewith. It will be noted that during the engagement of the hook member with the projection the bell crank 217 will have pivoted through a sufficient arc to move the two toggle linkages well past their down center position so that the weight of the parts themselves including the lever 67 will naturally bias the parts into their extreme open position as shown in Figure 5.

Figure 4A:
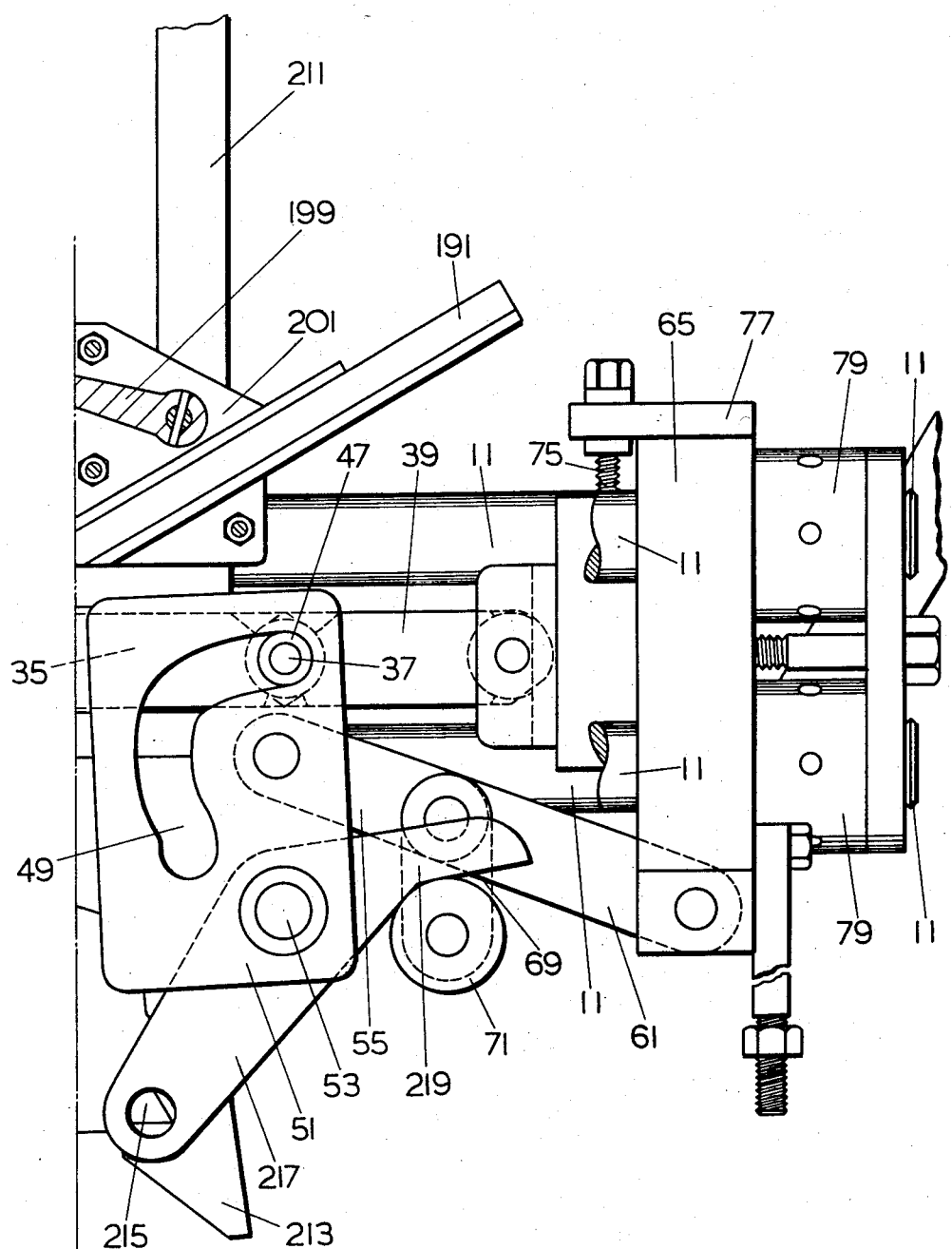

The downwardly-extending arm 187, as stated above, is indirectly connected at its upper end to the head member 3. As shown in Figure 4a, the indirect connection includes a sleeve 221 having a shouldered portion 223 at its upper end and a sleeve 225, connected to the head member 3 and having a shouldered portion 227 at its lower end. A solid block 229 is firmly fixed within the upper end portion of the sleeve 225. The indirect connection thus provides for some initial lost motion between the arm 187 and the head member 3 during the initial downward movement of the head member and during its initial upward movement. This arrangement enables an accurate setting to be obtained between the application of the high hydraulic pressure to the interior of the blank and the timing of the retractive movement of the head portion 181.

Figure 5:
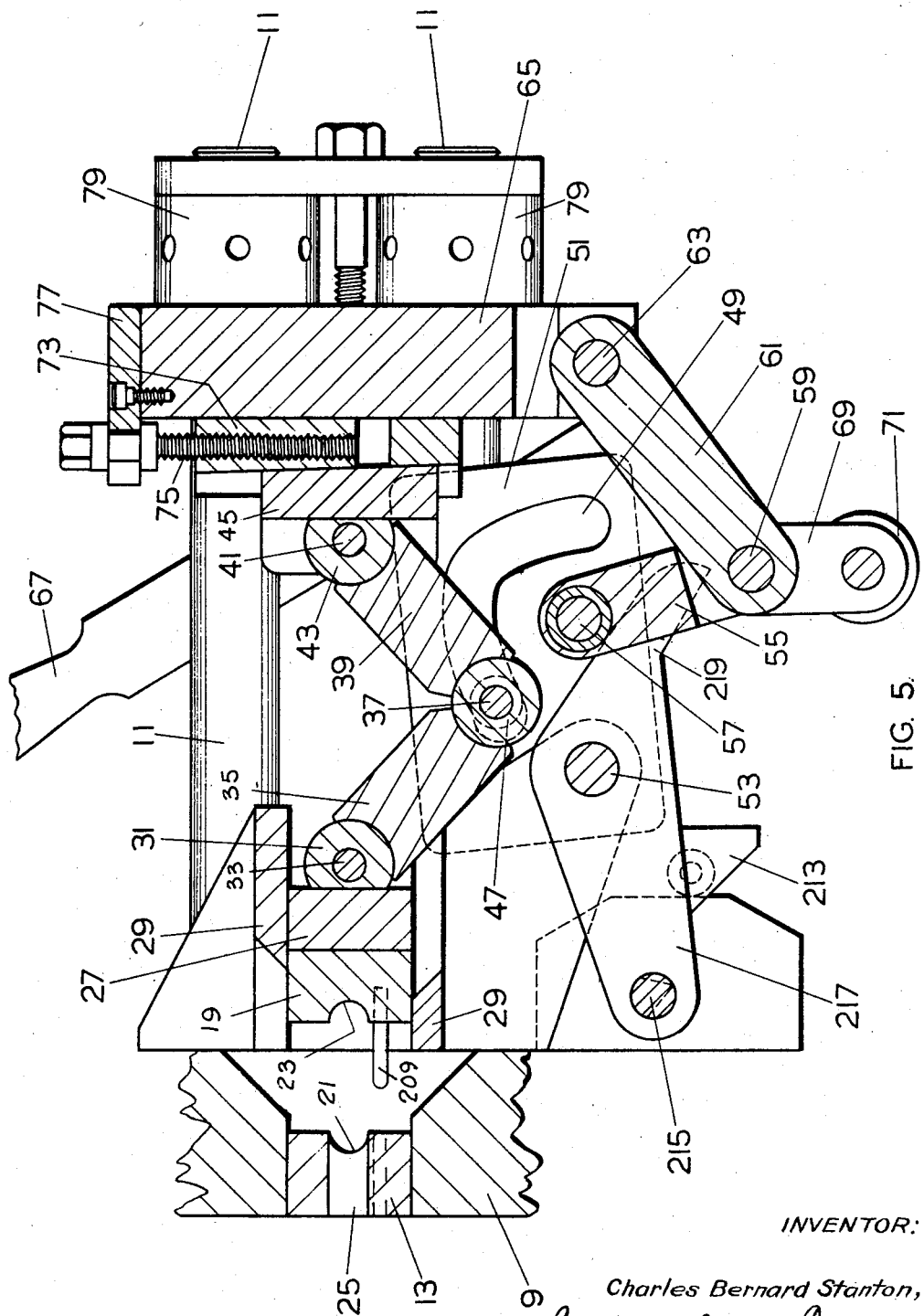
Figure 5 is a part sectional view of the die-closing mechanism of the preferred apparatus, showing the die in open position.
Figure 6:
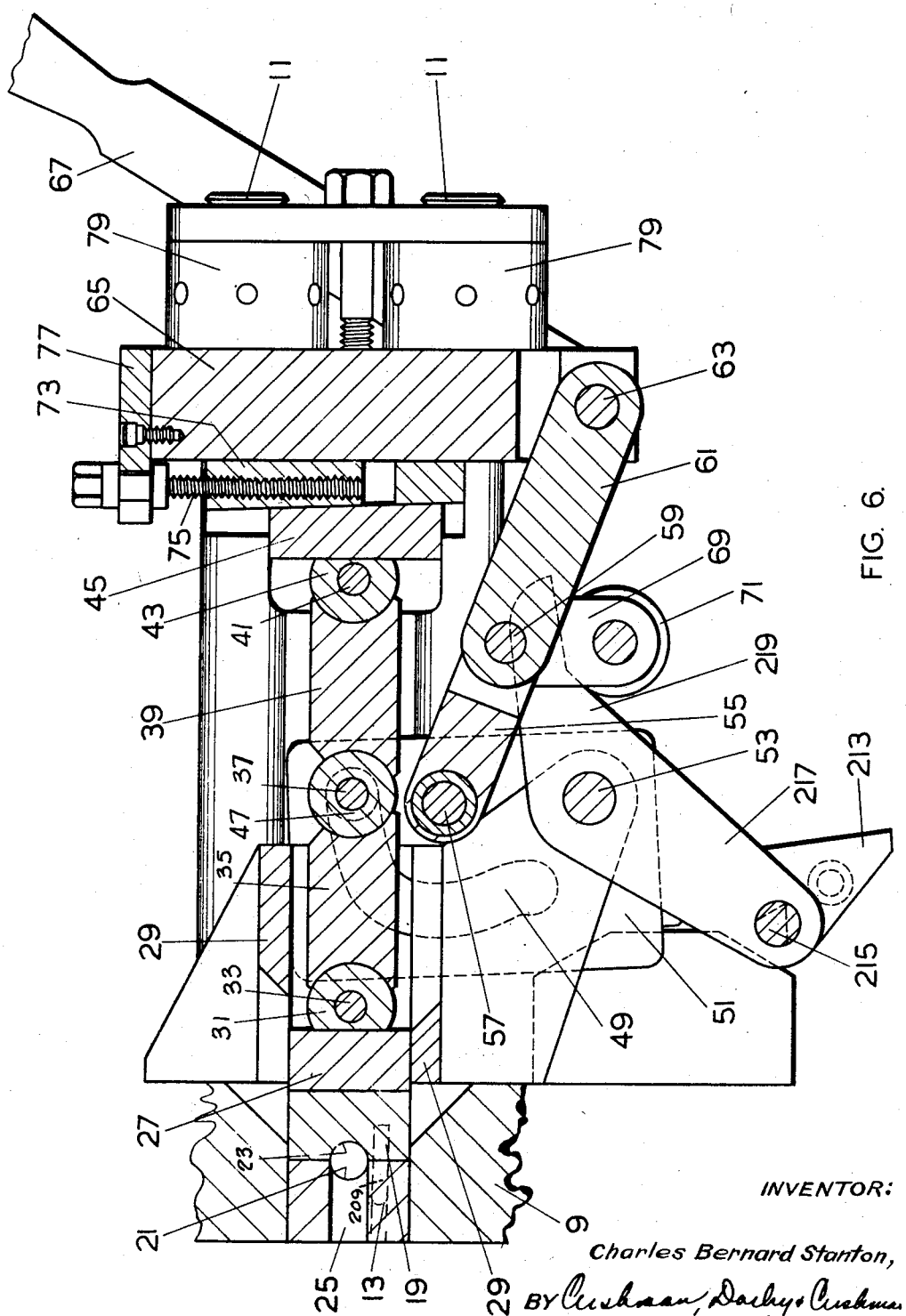
Figure 6 is a view similar to that of Figure 5 showing the die in closed position.

In operating the preferred apparatus, at the outset the die will be in the open position shown in Figure 5 and the chute will be loaded with substantially tubular blanks. The head member 3 will be in its uppermost position, a constant head of liquid, such as water, will be maintained in the tank 129 and the supply of low pressure liquid will be switched on.

The handle 203 will be moved from right to left to allow a substantially tubular blank B to drop upon the tracks 209 in front of the movable forward portion of the die 19 and the spring 207 will urge the blank toward the semi-circular recess. The operating handle 67 will then be moved from the position shown in Figure 5 to the position shown in Figure 6. Movement of the handle 67 causes a straightening of the toggle mechanism 55, 61, rotation of the cam plate 51 and a straightening of the toggle mechanism 35, 39 with a consequential closing of the die. Thus the blank is moved into the die which is tightly locked by the straightened toggle. Due to the projection of the head portion 181 beyond the rearward portion 13 of the die, a slight dimpling of the wall of the blank will occur. This tends to prevent any undue thinning of the wall of the blank during the initial extrusion operation.

When the die is closed, low pressure water will be supplied to the interior of the blank B, thereby displacing all the air in the blank outwardly through the space 23 which communicates with the atmosphere. The head member 3 will be caused to move downwardly. The plungers 85, 87 will be caused to move inwardly until the shoulders on the forward portions engage the tubular blank, thereby substantially trapping the low pressure water within the blank. There will now be no air in the blank and since the blank is filled with water before the application of high pressure thereto, no turbulence will occur when water at high pressure is applied to the interior of the blank. Prior to this the pistons 137, 139 will have entered the cylinders 123, 125 displacing some of the liquid therein. This will cause operation of the check valve so as to cut off the supply of water at low pressure to the blank and to provide water at a high and increasing pressure to the blank. While the high pressure is being supplied to the blank the material of the blank will be fed towards its central portion by further inward movement of the plungers 85, 87. This will enable material of the blank to be extruded into the branch cavity 25 by the high hydraulic pressure. As soon as the material of the blank begins to be extruded into the branch cavity 25 to form a branched portion B, the lost motion between the head member 3 and the arm 187 will cease and the latter will move downwardly due to engagement of the block 229 with the shoulder 223. During extrusion the branch B will be supported by the head portion 181 which is capable of retraction at a constant rate due to downward movement of the arm 187. This regulated retraction of the head portion 181 controls the wall thickness of the branch B. Any leakage occurring from the tubular blank can readily be made good since the available volume of water is always in excess of the forming volume.

When the head member is in its lowermost position the branched pipe fitting will have been formed, and as the head member moves upwardly to its inoperative position, the die will be positively opened through the operation of the hook member 213, as described above. During this time the arm 187 will remain stationary, but when the die is opened and the plungers have been withdrawn from the formed fitting, the formed fitting is ejected by the spring-urged head portion 181 which as stated above projects beyond the rearward portion 13 of the die when the latter is opened.

I claim:
1. Apparatus for forming branched pipe fittings from substantially tubular blanks comprising a base, a head movable with respect thereto, a plurality of complementary die members carried by said base, means for moving said die members apart and together, said die members together defining a main cavity and at least one branch cavity in communication therewith, plunger means movable in said main cavity for longitudinally compressing a blank disposed therein, means responsive to the movement of said head in one direction for moving said plunger means to longitudinally compress said blank, means responsive to the movement of said head in said one direction for applying a high hydraulic pressure through said plunger means to the interior of a blank, a support member movable in said branch cavity for supporting the end portion of the branch formed therein, and means responsive to the movement of said head in said one direction for controlling the outward movement of said support member, said last mentioned means being operable in response to movement of said head in the opposite direction to eject a formed fitting from said die members when the latter are apart, and said last mentioned means comprising a member having an inclined surface, said inclined surface being operatively connected with said support member, and a lost motion connection between said member and said head.

2. Apparatus for forming branched pipe fittings from substantially tubular blanks comprising a base, a head movable with respect thereto, a plurality of complementary die members carried by said base, said die members together defining a main cavity and at least one branch cavity in communication therewith, plunger means movable in said main cavity for longitudinally compressing a blank disposed therein, means responsive to the movement of said head in one direction for moving said plunger, means to longitudinally compress said blank, means for supplying a low pressure hydraulic fluid through said plunger means to the interior of said blank, means responsive to the movement of said head in said one direction for interrupting the supply of said low pressure fluid and applying a high hydraulic pressure through said plunger means to the interior of said blank, a support member movable in said branch cavity for supporting the end portion of the branch formed therein, and means responsive to the movement of said head in said one direction for controlling the outward movement of said support member, and said pressure interrupting and applying means comprising a cylinder in said base, a piston carried by said head slidable in said cylinder, and means for connecting said cylinder to said low pressure supply means including a check valve operable upon pressure applying movement of said piston to cut off the supply of said low pressure hydraulic fluid.

3. Apparatus for forming branched pipe fittings from substantially tubular blanks comprising support means, a plurality of complementary die members carried by said support means, means for opening and closing said die members, said die members when closed defining a main cavity and at least one branch cavity in communication therewith, plunger means movable in said main cavity for longitudinally compressing a blank disposed therein, means operatively associated with said plunger means for moving the latter inwardly to compress said blank and for retracting the same after a fitting has been formed, means for applying a high hydraulic pressure through said plunger means to the interior of said blank, a support member movable in said branch cavity for supporting the end portion of the branch formed therein, means responsive to the operation of said moving means to move said plunger means inwardly for controlling the outward movement of said support member and means responsive to the operation of said moving means to retract said plunger means for actuating said opening and closing means to open said die members, and means adjacent said die members for feeding blanks therebetween.

4. Apparatus for forming branched pipe fittings from substantially tubular blanks comprising support means, a plurality of complementary die members carried by said support means, means for opening and closing said die members, said die members when closed defining a main cavity and at least one branch cavity in communication therewith, plunger means movable in said main cavity for longitudinally compressing a blank disposed therein, means operatively associated with said plunger means for moving the latter inwardly to compress said blank and for retracting the same after a fitting has been formed, means for applying a high hydraulic pressure through said plunger means to the interior of said blank, a support member movable in said branch cavity for supporting the end portion of the branch formed therein, means responsive to the operation of said moving means to move said plunger means inwardly for controlling the outward movement of said support member and means responsive to the operation of said moving means to retract said plunger means for actuating said opening and closing means to open said die members and said support member control means being operable to move said support member inwardly to eject a formed fitting from said die members in coordination with the operation of said moving means to retract said plunger means, and means adjacent said die members for feeding blanks therebetween.

5. Apparatus for forming branched pipe fittings from substantially tubular blanks comprising support means, a plurality of complementary die members carried by said support means, means for opening and closing said die members, said die members when closed defining a main cavity and at least one branch cavity in communication therewith, plunger means movable in said main cavity for longitudinally compressing a blank disposed therein, means operatively associated with said plunger means for moving the latter inwardly to compress said blank and for retracting the same after a fitting has been formed, means for applying a high hydraulic pressure through said plunger means to the interior of said blank, a support member movable in said branch cavity for supporting the end portion of the branch formed therein, means responsive to the operation of said moving means to move said plunger means inwardly for controlling the outward movement of said support member and means responsive to the operation of said moving means to retract said plunger means for actuating said opening and closing means to open said die members, and means for initially supplying a low hydraulic pressure through said plunger means to the interior of said blank, said high hydraulic pressure applying means being adapted to cut off said low hydraulic pressure supply means and apply said high hydraulic pressure in response to the operation of said moving means to move said plunger means inwardly, said support member control means being operable to move said support member inwardly to eject a formed fitting from said die member in co-ordination with the operation of said moving means to retract said plunger means, and means adjacent said die members for feeding blanks therebetween.

6. Apparatus for forming branched pipe fittings from substantially tubular blanks comprising a base, a head movable with respect thereto, a plurality of complementary die members carried by said base, means for opening and closing said die members, said die members when closed defining a main cavity and at least one branch cavity in communication therewith, plunger means movable in said main cavity for longitudinally compressing a blank disposed therein, said plunger means being operatively connected with said head whereby movement of said head in one direction will move said plunger means to compress said blank and movement of said head in the opposite direction will retract said plunger means, means responsive to the movement of said head in said one direction for applying a high hydraulic pressure through said plunger means to the interior of a blank, a support member movable in said branch cavity to support the end portion of the branch formed therein, means responsive to the movement of said head in said one direction for controlling the outward movement of said support member, and means for actuating said opening and closing means to open said die members in co-ordination with the movement of said head in said opposite direction, and means for feeding blanks to said die members, said feeding means comprising a chute carried by said base, and a plunger movably mounted on said base adjacent said die members, said plunger being adapted to engage a single blank in said chute and carry it between the said die members when open.

7. Apparatus for forming branched pipe fittings from substantially tubular blanks comprising a base, a head movable with respect thereto, a plurality of complementary die members carried by said base, means for opening and closing said die members, said die members when closed defining a main cavity and at least one branch cavity in communication therewith, plunger means movable in said main cavity for longitudinally compressing a blank disposed therein, said plunger means being operatively connected with said head whereby movement of said head in one direction will move said plunger means to compress said blank and movement of said head in the opposite direction will retract said plunger means, means responsive to the movement of said head in said one direction for applying a high hydraulic pressure through said plunger means to the interior of a blank, a support member movable in said branch cavity to support the end portion of the branch formed therein, means responsive to the movement of said head in said one direction for controlling the outward movement of said support member, and means for actuating said opening and closing means to open said die members in co-ordination with the movement of said head in said opposite direction, and said support member control means comprising a cam member slidably engaging said support member and a lost motion connection between said cam member and said head, said cam member being operable upon the movement of said head in said opposite direction to move said support member inwardly to eject a fitting formed in said die members.

(References on following page)

References Cited in the file of this patent

UNITED STATES PATENTS

| | | |
|---|---|---|
| 2,027,285 | Parker | Jan. 7, 1936 |
| 2,037,795 | Johnson | Apr. 21, 1936 |
| 2,138,199 | Wendel | Nov. 29, 1938 |
| 2,199,830 | Cornell | May 7, 1940 |
| 2,203,868 | Gray | June 11, 1940 |
| 2,238,037 | Cornell | Apr. 15, 1941 |
| 2,243,809 | Wendell | May 27, 1941 |
| 2,331,430 | Shoemaker | Oct. 12, 1943 |
| 2,767,765 | Cartwright | Oct. 23, 1956 |

FOREIGN PATENTS

| | | |
|---|---|---|
| 1,048,482 | France | Dec. 22, 1953 |